(12) United States Patent
Chu et al.

(10) Patent No.: US 11,148,520 B2
(45) Date of Patent: Oct. 19, 2021

(54) BATTERY TRAY AND VEHICLE

(71) Applicant: CONTEMPORARY AMPEREX TECHNOLOGY CO., LIMITED, Fujian (CN)

(72) Inventors: Yannan Chu, Fujian (CN); Jinqing Ji, Fujian (CN); Mu Qian, Fujian (CN); Jiubiao Lin, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 0 days.

(21) Appl. No.: 17/133,594

(22) Filed: Dec. 23, 2020

(65) Prior Publication Data

US 2021/0114449 A1  Apr. 22, 2021

Related U.S. Application Data

(63) Continuation of application No. PCT/CN2019/114038, filed on Oct. 29, 2019.

(30) Foreign Application Priority Data

Nov. 27, 2018 (CN) .......................... 201821967959.2

(51) Int. Cl.
*H01M 4/02* (2006.01)
*B60K 1/04* (2019.01)
(Continued)

(52) U.S. Cl.
CPC ............. *B60K 1/04* (2013.01); *H01M 50/204* (2021.01); *H01M 50/236* (2021.01);
(Continued)

(58) Field of Classification Search
CPC ....................................................... H01M 4/02
See application file for complete search history.

(56) References Cited

U.S. PATENT DOCUMENTS

| 2016/0288636 A1 | 10/2016 | Kamimura et al. |
| 2017/0036524 A1 | 2/2017 | Ikeda et al. |
(Continued)

FOREIGN PATENT DOCUMENTS

| CN | 106553515 A | 4/2017 |
| CN | 206584986 U | 10/2017 |
(Continued)

*Primary Examiner* — Jacob B Marks
(74) *Attorney, Agent, or Firm* — Scully Scott Murphy & Presser

(57) ABSTRACT

A battery tray and a vehicle include a frame structure including a plurality of frames sequentially connected end to end arranged to be connected to the vehicle, and a base plate structure including an inner base plate and a reinforcing beam, wherein the inner base plate is located on an inner side of the reinforcing beam and arranged for mounting a battery module. The battery tray further includes a reinforcing block, wherein the reinforcing block is connected to a corresponding frame and the reinforcing beam in a matching mode, so as to fixedly connect the reinforcing beam to the frame structure through the reinforcing block. In the battery tray, the strength of the battery tray can be enhanced and a total weight can be decreased only by using the reinforcing block to fixedly connect the reinforcing beam to the frame structure.

12 Claims, 4 Drawing Sheets

(51) Int. Cl.
*H01M 50/244* (2021.01)
*H01M 50/236* (2021.01)
*H01M 50/258* (2021.01)
*H01M 50/204* (2021.01)

(52) U.S. Cl.
CPC ....... *H01M 50/244* (2021.01); *H01M 50/258* (2021.01); *B60K 2001/0438* (2013.01); *H01M 2220/20* (2013.01)

(56) References Cited

U.S. PATENT DOCUMENTS

| | | |
|---|---|---|
| 2017/0087972 A1 | 3/2017 | Hara et al. |
| 2018/0138473 A1 | 5/2018 | Bessho et al. |
| 2018/0272853 A1 | 9/2018 | Wang et al. |
| 2019/0100090 A1* | 4/2019 | Matecki .......... B60L 50/66 |

FOREIGN PATENT DOCUMENTS

| | | |
|---|---|---|
| CN | 107851753 A | 3/2018 |
| CN | 209176495 U | 7/2019 |
| DE | 102016121252 A1 | 5/2018 |
| DE | 102017106648 A1 | 10/2018 |
| JP | 2013256265 A | 12/2013 |
| WO | 2015083487 A1 | 6/2015 |

\* cited by examiner

BATTERY TRAY AND VEHICLE

CROSS-REFERENCE TO RELATED APPLICATIONS

This application is a continuation of International Application No. PCT/CN2019/114038, filed on Oct. 29, 2019, which claims priority to Chinese Patent Application No. 201821967959.2, filed on Nov. 27, 2018. The disclosures of the aforementioned applications are hereby incorporated by reference in their entireties.

TECHNICAL FIELD

The application relates to the field of electric vehicles, and in particular to a battery tray and a vehicle.

BACKGROUND

In the art of electric vehicles, a battery tray is configured to mount and accommodate a battery module and generally includes a frame structure and a reinforcing structure. At present, in order to enhance the strength of the battery tray, the generally-used means is to increase thicknesses of the frame structure and the reinforcing structure of the battery tray, resulting in the increase of a weight, however, the increase of the weight makes the strength enhancement and the weight decrease mutually-constrained factors, and therefore it is difficult to realize the lightweight while the strength of the battery tray is enhanced.

SUMMARY

In consideration of the defects of the prior art, an objective of the application is to provide a battery tray and a vehicle, through which the strength of the battery tray could be enhanced and a total weight can be decreased.

In order to realize the above-mentioned objective, the application provides a battery tray. The battery tray includes a frame structure including a plurality of frames sequentially connected end to end arranged to be connected to a vehicle, and a base plate structure including an inner base plate and a reinforcing beam, wherein the inner base plate is located on an inner side of the reinforcing beam and arranged for mounting a battery module, and the inner base plate and the reinforcing beam are fixed inside the frame structure. The battery tray further includes a reinforcing block, wherein a first end of the reinforcing block is connected to a corresponding frame in a matching mode, and a second end of the reinforcing block is connected to the reinforcing beam in a matching mode, so as to fixedly connect the reinforcing beam to the frame structure through the reinforcing block.

In one embodiment, the first end of the reinforcing block is connected to the corresponding frame in a concave-convex fit mode.

In one embodiment, the first end of the reinforcing block is provided with a first step portion, a first groove is formed in the first step portion, and the corresponding frame is provided with a first protrusion matching the first groove.

In one embodiment, the second end of the reinforcing block is connected to an end of the reinforcing beam in a concave-convex fit mode.

In one embodiment, the second end of the reinforcing block is provided with a second upper step portion, a second upper groove is formed in the second upper step portion, and the end of the reinforcing beam is provided with a second upper protrusion matching the second upper groove.

In one embodiment, the second end of the reinforcing block is further provided with a second lower step portion, a second lower groove is formed in the second lower step portion, and the end of the reinforcing beam is provided with a second lower protrusion matching the second lower groove.

In one embodiment, a top surface of the reinforcing block is flush with a top surface of the reinforcing beam provided with the second upper protrusion, and the top surface of the reinforcing block is flush with a top surface of the frame provided with the first protrusion.

In one embodiment, a bottom surface of the reinforcing block is flush with a bottom surface of the reinforcing beam provided with the second lower protrusion, and the bottom surface of the reinforcing block is flush with a bottom surface of the frame provided with the first protrusion.

In one embodiment, the inner base plate is provided with a plurality of inner recesses arranged to accommodate the battery module.

In one embodiment, a plurality of reinforcing beams are arranged; and the base plate structure further includes a support beam connected between two adjacent reinforcing beams.

In order to realize the above-mentioned objective, the application further provides a vehicle. The vehicle includes a battery tray and a battery module, wherein the battery tray is the battery tray in any of the above-mentioned embodiments, the battery tray is connected to the vehicle, and the battery module is mounted at the battery tray.

The beneficial effects of the application are as follows:

in the battery tray of the application, it is not needed to process the frame structure and the reinforcing beam as in the background art, and since a size and a weight of the reinforcing block are much smaller than those of the frame structure and the reinforcing beam, compared with a mode that the frame structure and the reinforcing beam are thickened in the background art, a weight is decreased only by using the reinforcing block to fixedly connect the reinforcing beam to the frame structure; and therefore, compared with the background art, the strength of the battery tray is enhanced and the total weight is decreased, so as to prevent the strength enhancement and the weight decrease from becoming mutually-constrained factors as in the background art.

Figure 1:
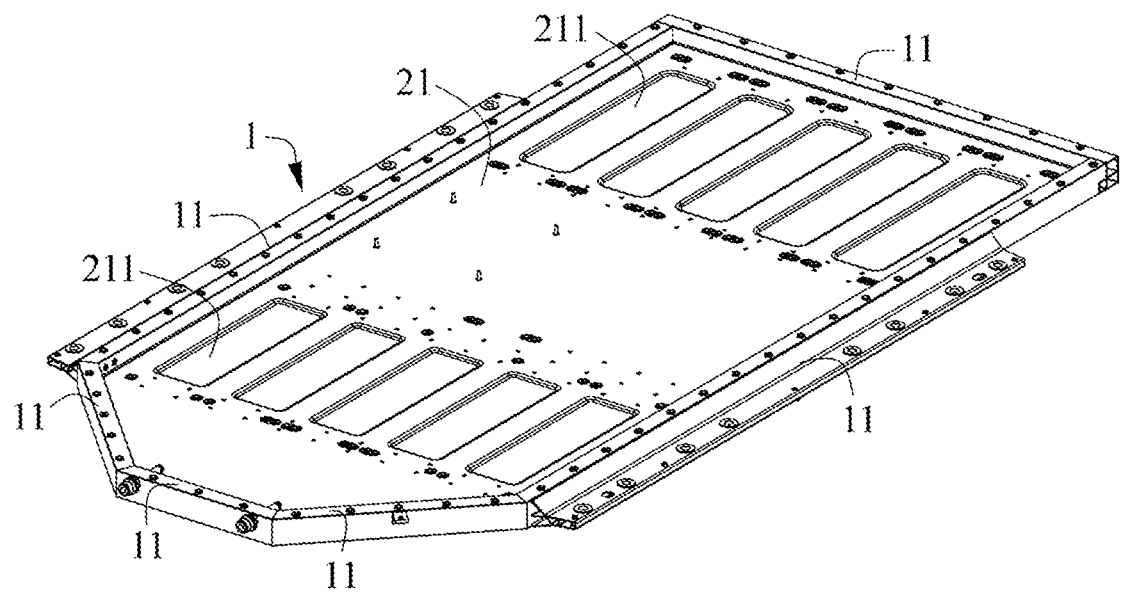
FIG. 1 is a stereogram of one embodiment of a battery tray of the application.

In the figures, the description of the reference numerals is as follows:

| | |
|---|---|
| 1 frame structure | 24 outer base plate |
| 11 frame | 3 reinforcing block |
| 111 first protrusion | 31 first end |
| 112A top surface | 32 second end |
| 112B bottom surface | 33 first step portion |
| 113 matching step | 331 first groove |
| 2 base plate structure | 34A second upper step portion |
| 21 inner base plate | 341A second upper groove |
| 211 inner recess | 34B second lower step portion |
| 22 reinforcing beam | 341B second lower groove |
| 221A second upper protrusion | 35A top surface |
| 221B second lower protrusion | 35B bottom surface |
| 222A top surface | R rivet |
| 222B bottom surface | S bush |
| 23 support beam | |

DESCRIPTION OF EMBODIMENTS

The accompanying drawings illustrate the embodiments of the application, it is to be understood that the disclosed embodiments are merely examples of the application that may be implemented in various forms, and therefore, the specific details disclosed herein should not be construed as limiting, but merely serve as a basis for the claims and as an indicative basis for teaching those of ordinary skill in the art to implement the application in various ways.

A battery tray of the application may be configured to accommodate a battery module.

The battery module (not shown) includes a plurality of batteries assembled together side by side. The battery may be a hard shell battery (or called as a tank type battery) or a soft package battery (or called as a bag type battery). The hard shell battery includes an electrode assembly, a housing, a top cover, poles, an injection hole, an explosion-proof valve and the like. An accommodating cavity is formed inside the housing, to accommodate the electrode assembly and an electrolyte. The electrode assembly includes a positive electrode plate, a negative electrode plate and a barrier isolating the positive electrode plate from the negative electrode plate. The electrode assembly can winding the positive electrode plate, the negative electrode plate and the barrier or stack the positive electrode plate, the negative electrode plate and the barrier. Each of the positive electrode plate and the negative electrode plate includes a current collector and an active substance layer arranged on the current collector. The soft package battery includes a packaging bag (for example, formed by an aluminum-plastic film), an electrode assembly (with the constitution and formation similar to those of the hard shell battery) and tabs. Parts of the tab is packaged in the packaging bag and the other part thereof extends out of the packaging bag. The tab may be directly formed by an electrode plate or uses an independent conductive material and is electrically connected to the current collector.

Figure 2:
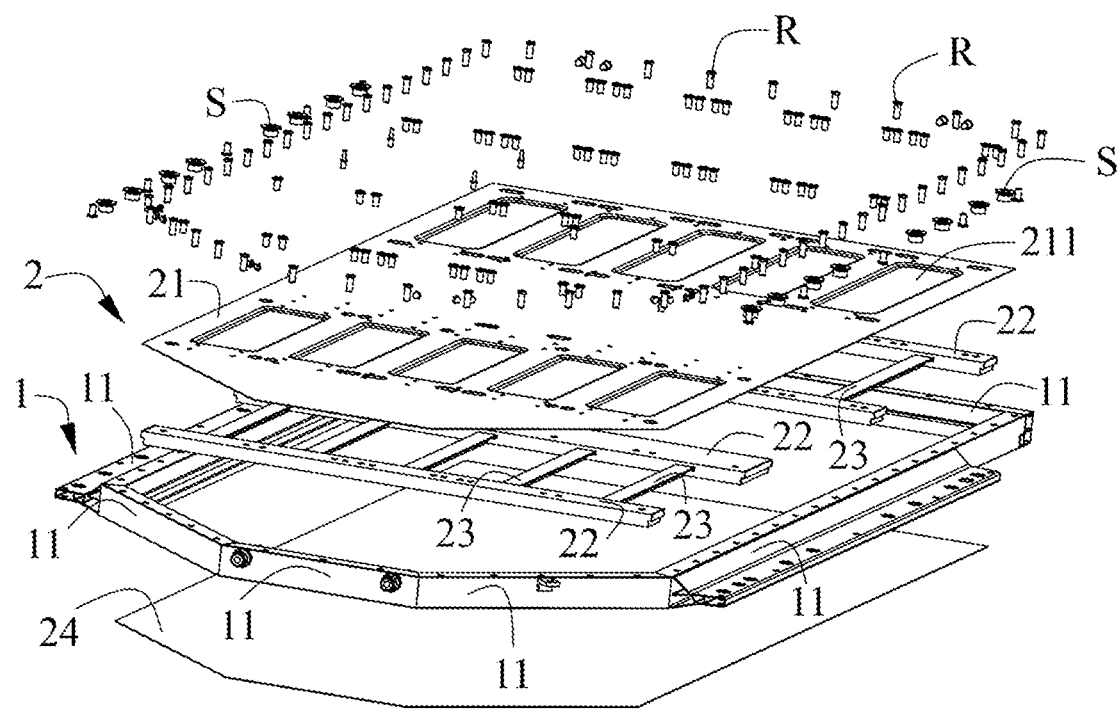
FIG. 2 is an exploded stereogram of the battery tray in FIG. 1.
Figure 3:
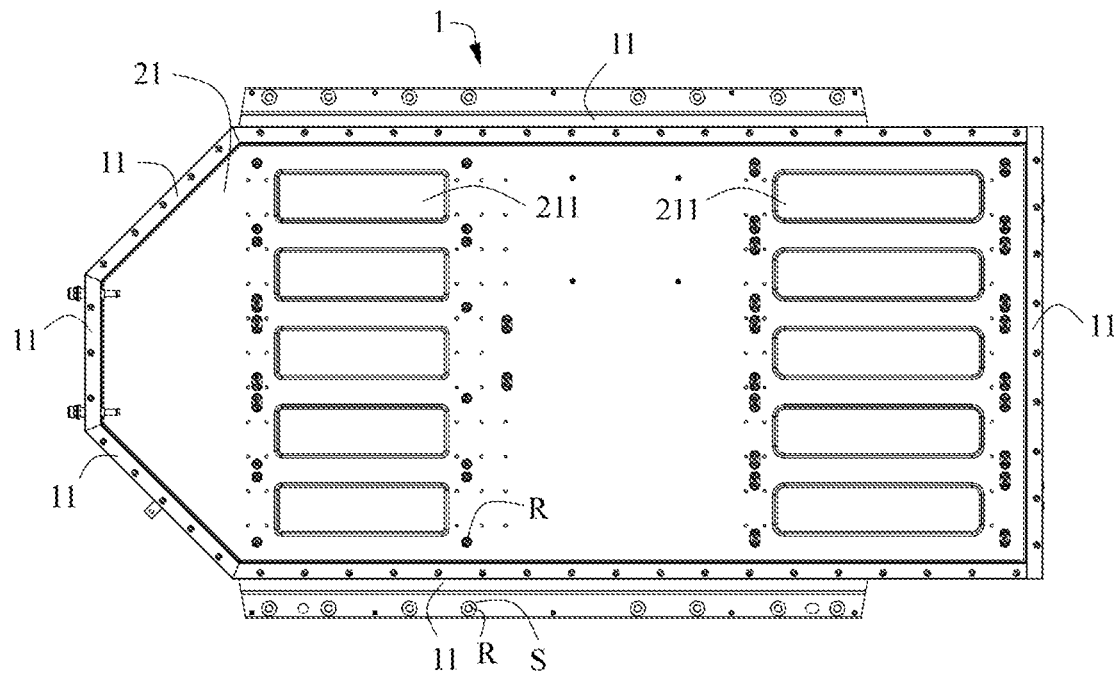
FIG. 3 is a top view of the battery tray in FIG. 1.
Figure 4:
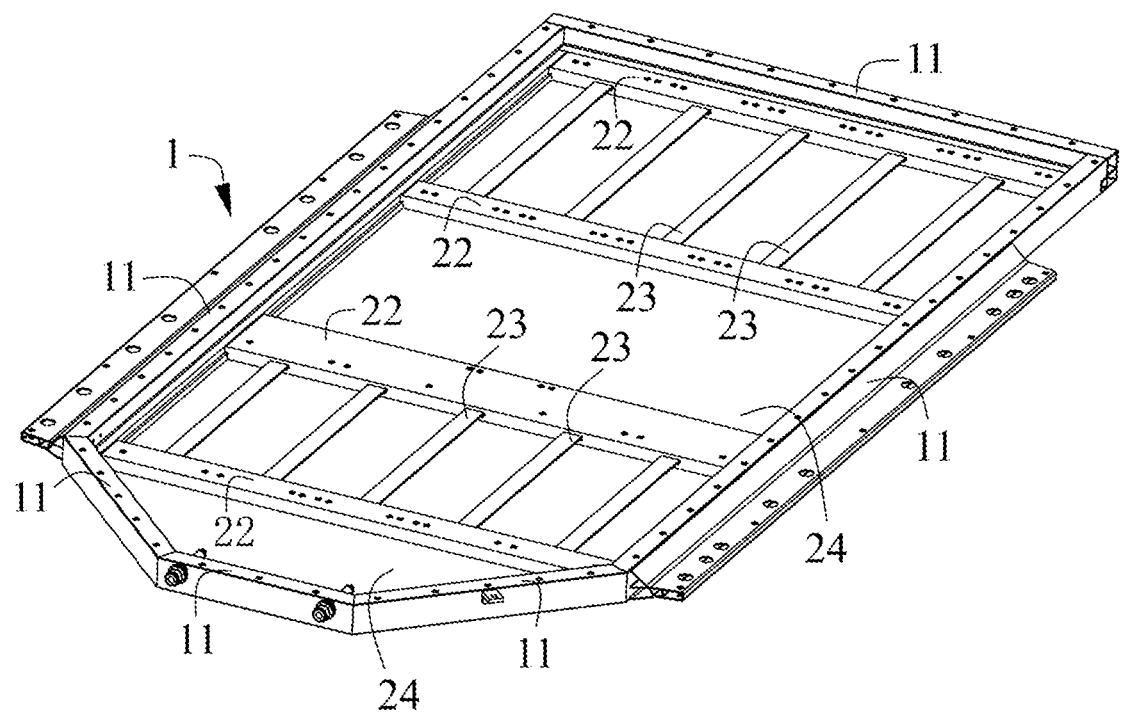
FIG. 4 is an assembly stereogram of a frame structure, and an outer base plate, a reinforcing beam and a support beam of a base plate structure of the battery tray in FIG. 1.
Figure 5:
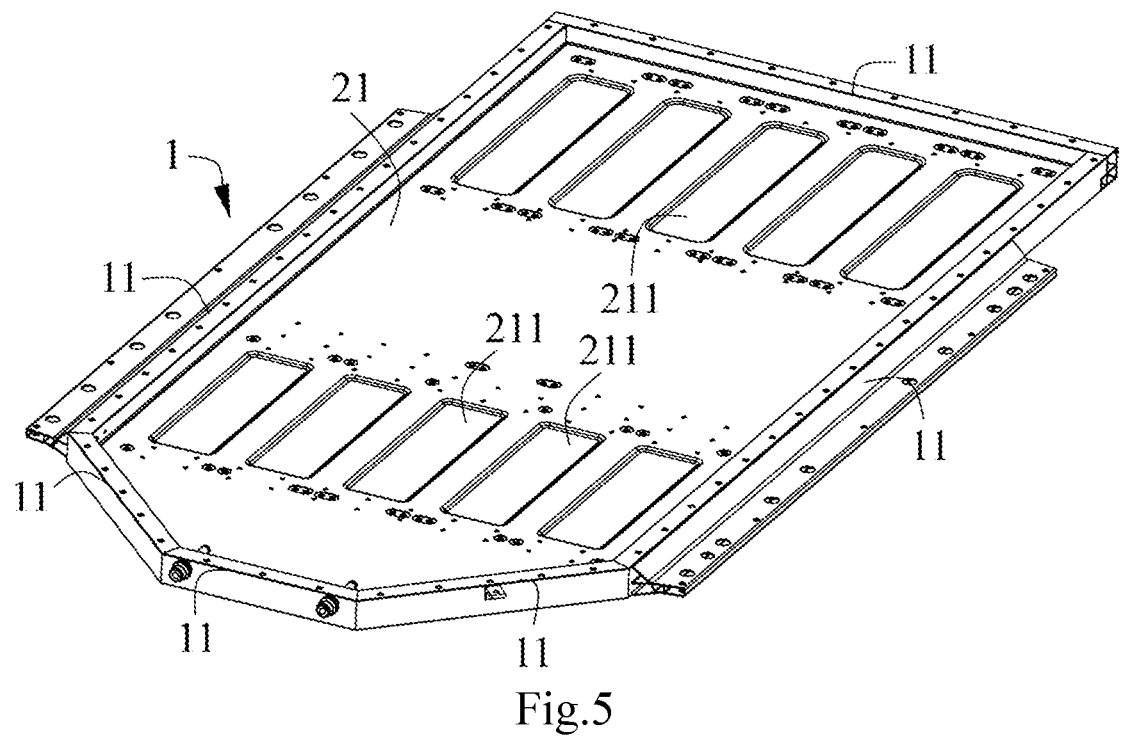
FIG. 5 is an assembly stereogram of the frame structure and the base plate structure of the battery tray in FIG. 1.
Figure 6:
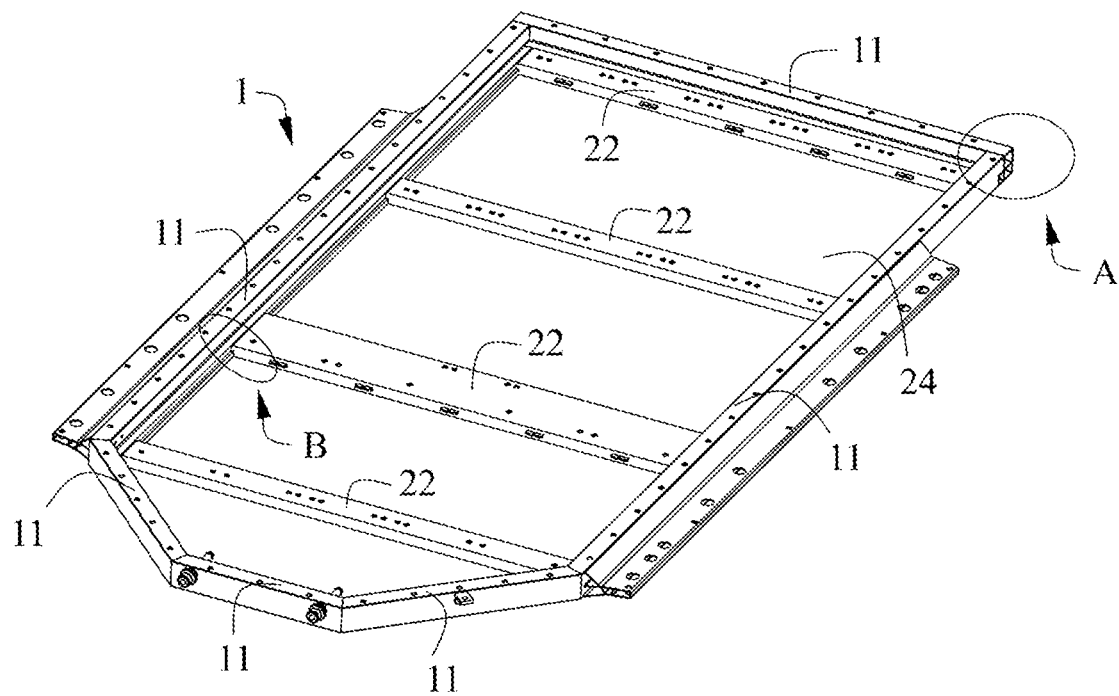
FIG. 6 is an assembly stereogram of the frame structure, and the outer base plate and the reinforcing beam of the base plate structure of the battery tray in FIG. 1.
Figure 7:
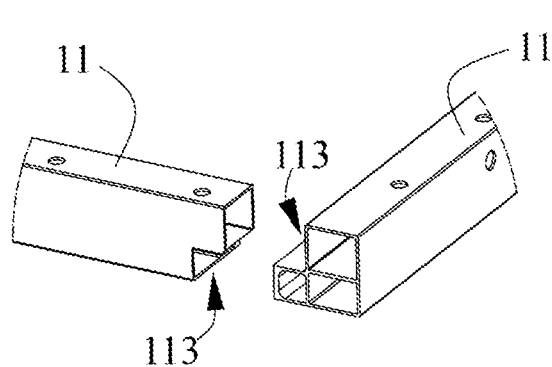
FIG. 7 is a partial stereogram of part A in FIG. 6, in which two frames in a state before assembly are illustrated.
Figure 8:
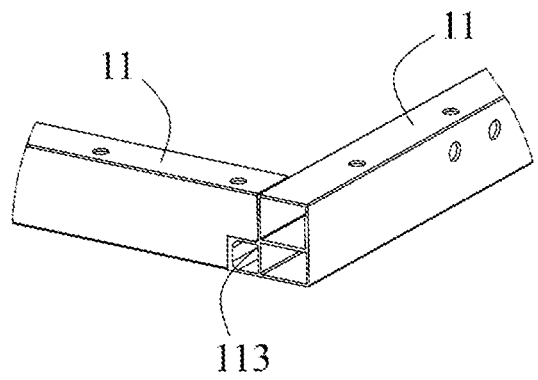
FIG. 8 is a partial stereogram of the part A in FIG. 6, in which the two frames in a state after assembly are illustrated.
Figure 9:
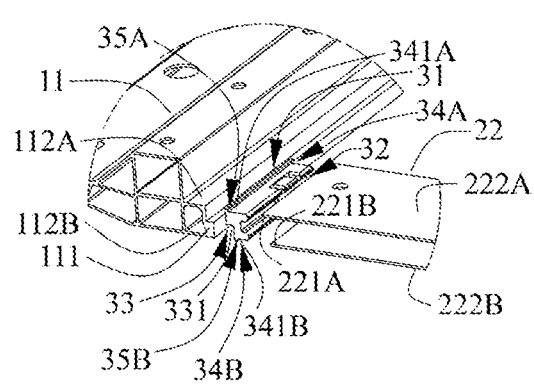
FIG. 9 is a partial stereogram of part B in FIG. 6, in which a frame, a reinforcing block and a reinforcing beam of the battery tray in a state before assembly are illustrated.
Figure 10:
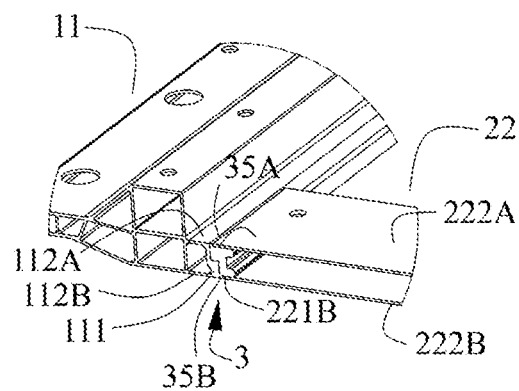
FIG. 10 is a partial stereogram of the part B in FIG. 6, in which the frame, the reinforcing block and the reinforcing beam of the battery tray in a state after assembly are illustrated.

FIG. 1 is a stereogram of one embodiment of the battery tray of the application; FIG. 2 is an exploded stereogram of the battery tray in FIG. 1; FIG. 3 is a top view of the battery tray in FIG. 1; FIG. 4 is an assembly stereogram of a frame structure, and an outer base plate, a reinforcing beam and a support beam of a base plate structure of the battery tray in FIG. 1; FIG. 5 is an assembly stereogram of the frame structure and the base plate structure of the battery tray in FIG. 1; FIG. 6 is an assembly stereogram of the frame structure, and the outer base plate and the reinforcing beam of the base plate structure of the battery tray in FIG. 1; FIG. 7 is a partial stereogram of part A in FIG. 6, in which two frames in a state before assembly are illustrated; FIG. 8 is a partial stereogram of the part A in FIG. 6, in which the two frames in a state after assembly are illustrated; FIG. 9 is a partial stereogram of part B in FIG. 6, in which a frame, a reinforcing block and a reinforcing beam of the battery tray in a state before assembly are illustrated; and FIG. 10 is a partial stereogram of the part B in FIG. 6, in which the frame, the reinforcing block and the reinforcing beam of the battery tray in a state after assembly are illustrated.

The battery tray of the application includes the frame structure 1, the base plate structure 2 and the reinforcing block 3.

The frame structure 1 includes a plurality of frames 11 sequentially connected end to end arranged to be connected to a vehicle. In order to decrease a weight of the whole battery tray, the frame structure 1 is made of an aluminum profile, and the frame structure 1 may be of a hollow structure. In order to make an upper surface of the frame 11 flush with a lower surface thereof, refer to FIGS. 6-8, an end of the frame 11 may be provided with a matching step 113, and all the frames 11 match one another through the matching steps 113 at the ends. The matching steps 113 at the ends of all the frames 11 correspondingly match one another and are fixed together in a welding mode.

The base plate structure 2 includes an inner base plate 21 and the reinforcing beam 22. The base plate structure 2 further includes the support beam 23 and the outer base plate 24.

The inner base plate 21 is made of a steel sheet, an aluminum sheet and the like. In order to increase a space utilization rate, the inner base plate 21 is provided with a plurality of inner recesses 211 arranged to accommodate the battery module. The plurality of recesses 211 are formed by stamping the inner base plate 21. The inner base plate 21 is located on an inner side of the reinforcing beam 22 and arranged for mounting the battery module, and the inner base plate 21 is fixed inside the frame structure 1. The inner base plate 21 is fixed inside the frame structure 1 in a detachable connection mode (for example, riveting, gluing or threaded connection), so as to reduce the welding deformation caused by a welding fixation mode.

The reinforcing beam 22 is made of an aluminum profile, so as to guarantee a light weight, a high lightness degree and a low cost. The reinforcing beam 22 is fixed inside the frame structure 1. In order to enhance the strength, a plurality of reinforcing beams 22 are arranged.

If the inner base plate 21 needs to bear a force in the use process, in order to enhance the strength, the support beam 23 is connected between two adjacent reinforcing beams 22. The support beam 23 is made of an aluminum profile, so as to guarantee a light weight, a high lightness degree and a low cost. The number of the support beam/support beams 23 between two adjacent reinforcing beams 22 may be set to one or more on the basis of the strength requirement.

The outer base plate 24 is fixed inside the frame structure 1 and located on an outer side of the reinforcing beam 22. The outer base plate 24 is made of an aluminum sheet, a skin and the like. The outer base plate 24 is preferably the skin, so as to decrease a total weight. The outer base plate 24 is fixed inside the frame structure 1 in a detachable connection mode (for example, riveting, gluing or threaded connection), so as to reduce the welding deformation caused by a welding fixation mode. In the embodiments shown in the figures, the base plate structure 2 enhances, through the combination between the inner base plate 21 and the outer base plate 24, the structural strength, to cope with the situations of collision, impact and the like. The inner base plate 21 and the frame structure 1 are fixedly connected together by using rivets R, and bushes S are further used at some parts needing the fixation reinforcement to realize the interference fit between the inner base plate 21 and the frame structure 1, so as to reduce the wear. The outer base plate 24 and the frame structure 1 are fixedly connected together through gluing.

The reinforcing block 3 is made of an aluminum profile, so as to guarantee a light weight, a high lightness degree and a low cost. A first end 31 of the reinforcing block 3 is connected to a corresponding frame 11 in a matching mode, and a second end 32 of the reinforcing block 3 is connected to the reinforcing beam 22 in a matching mode, so as to fixedly connect the reinforcing beam 22 to the frame structure 1 through the reinforcing block 3. For one reinforcing beam 22, the number of the reinforcing blocks 3 may be two, first ends 31 of the two reinforcing blocks 3 are separately connected to corresponding frames 11 in a matching mode, and second ends 32 of the two reinforcing blocks 3 separately correspond to two ends of a reinforcing beam 22 and are connected to the same in a matching mode. The first end 31 of the reinforcing block 3 is arranged to be connected to the corresponding frame 11 through friction stir welding, and the second end 32 of the reinforcing block 3 is arranged to be connected to an end of the corresponding reinforcing beam 22 through friction stir welding. The friction stir welding process is low in thermal deformation, small in residual stress and high in welding quality. After friction stir welding, due to the characteristics of the welding process, difficult-to-distinguish solid joints are formed between the reinforcing block 3 and each of the corresponding frame 11 and the reinforcing beam 22, instead of what is shown in FIG. 10 that matching connection relations of various structures among the reinforcing block 3, the corresponding frame 11 and the reinforcing beam 22 can be clearly seen.

Particularly, take one reinforcing block 3 for the description, a first end 31 of the reinforcing block 3 is connected to a corresponding frame 11 in a concave-convex fit mode, so as to make positioning accurate and connection stable. The first end 31 of the reinforcing block 3 is provided with a first step portion 33, a first groove 331 is formed in the first step portion 33, and the corresponding frame 11 is provided with a first protrusion 111 matching the first groove 331. A second end 32 of the reinforcing block 3 is connected to an end of a reinforcing beam 22 in a concave-convex fit mode, so as to make positioning accurate and connection stable. The second end 32 of the reinforcing block 3 is provided with a second upper step portion 34A, a second upper groove 341A is formed in the second upper step portion 34A, and the end of the reinforcing beam 22 is provided with a second upper protrusion 221A matching the second upper groove 341A. The second end 32 of the reinforcing block 3 is further provided with a second lower step portion 34B, a second lower groove 341B is formed in the second lower step portion 34B, and the end of the reinforcing beam 22 is provided with a second lower protrusion 221B matching the second lower groove 341B. By means of this above-mentioned matching connection mode between the first groove 331 and the first protrusion 111, between the second upper groove 341A and the second upper protrusion 221A, and between the second lower groove 341B and the second lower protrusion 221B, positioning is accurate and connection is stable, thereby improving the overall strength of the battery tray.

In order to facilitate mounting, positioning and machining, a top surface 35A of the reinforcing block 3 is flush with a top surface 222A, provided with the second upper protrusion 221A, of the reinforcing beam 22, and the top surface 35A of the reinforcing block 3 is flush with a top surface 112A, provided with the first protrusion 111, of the frame 11; and a bottom surface 35B of the reinforcing block 3 is flush with a bottom surface 222B, provided with the second lower protrusion 221B, of the reinforcing beam 22, and the bottom surface 35B of the reinforcing block 3 is flush with a bottom surface 112B, provided with the first protrusion 111, of the frame 11.

In the battery tray of the application, it is not needed to process the frame structure 1 and the reinforcing beam 2 as in the background art, and since a size and a weight of the reinforcing block 3 are much smaller than those of the frame structure 1 and the reinforcing beam 2, compared with a mode that the frame structure 1 and the reinforcing beam 2 are thickened in the background art, the weight is decreased only by using the reinforcing block 3 to fixedly connect the reinforcing beam 22 to the frame structure 1; and therefore, compared with the background art, the strength of the battery tray is enhanced and the total weight is decreased, so as to prevent the strength enhancement and the weight decrease from becoming mutually-constrained factors as in the background art.

A vehicle of the application includes a battery tray and a battery module, wherein the battery module is mounted at the battery tray, a frame 11 of a frame structure 1 of the battery tray is connected to the vehicle, and an inner base plate 21 of a base plate structure 2 mounts the battery module.

The detailed description above describes a plurality of exemplary embodiments, but it is not intended to be limited to an explicitly disclosed combination herein. Hence, unless otherwise indicated, various features disclosed herein may be combined together to form a plurality of additional combinations which are not shown for an objective of simplicity.

What is said above is merely the preferred embodiments of the application, but is not used for limiting the application, and for a person skilled in the air, the application may have various alterations and changes. Any modifications, equivalent replacements, improvements and the like made within the spirit and principle of the application should all fall within the scope of protection of the application.

What is claimed is:

1. A battery tray, comprising:
   a frame structure, comprising a plurality of frames sequentially connected end to end, and arranged to be connected to a vehicle; and
   a base plate structure, comprising an inner base plate and a reinforcing beam, the inner base plate being located on an inner side of the reinforcing beam and arranged for mounting a battery module, and the inner base plate and the reinforcing beam being fixed inside the frame structure; and
   the battery tray further comprising:
   a reinforcing block, a first end of the reinforcing block being connected to a corresponding frame in a matching mode, and a second end of the reinforcing block being connected to the reinforcing beam in a matching mode, so as to fixedly connect the reinforcing beam to the frame structure through the reinforcing block, wherein the first end of the reinforcing block is connected to the corresponding frame in a concave-convex fit mode.

2. The battery tray according to claim 1, wherein the first end of the reinforcing block is provided with a first step portion, a first groove is formed in the first step portion, and the corresponding frame is provided with a first protrusion matching the first groove.

3. The battery tray according to claim 2, wherein the top surface of the reinforcing block is flush with a top surface of the frame provided with the first protrusion.

4. The battery tray according to claim 2, wherein the bottom surface of the reinforcing block is flush with a bottom surface of the frame provided with the first protrusion.

5. The battery tray according to claim 1, wherein the second end of the reinforcing block is connected to an end of the reinforcing beam in a concave-convex fit mode.

6. The battery tray according to claim 5, wherein the second end of the reinforcing block is provided with a second upper step portion, a second upper groove is formed in the second upper step portion, and the end of the reinforcing beam is provided with a second upper protrusion matching the second upper groove.

7. The battery tray according to claim 6, wherein a top surface of the reinforcing block is flush with a top surface of the reinforcing beam provided with the second upper protrusion.

8. The battery tray according to claim 5, wherein the second end of the reinforcing block is further provided with a second lower step portion, a second lower groove is formed in the second lower step portion, and the end of the reinforcing beam is provided with a second lower protrusion matching the second lower groove.

9. The battery tray according to claim 8, wherein a bottom surface of the reinforcing block is flush with a bottom surface of the reinforcing beam provided with the second lower protrusion.

10. The battery tray according to claim 1, wherein the inner base plate is provided with a plurality of inner recesses arranged to accommodate the battery module.

11. The battery tray according to claim 1, wherein a plurality of reinforcing beams are arranged, the base plate structure further comprises a support beam connected between two adjacent reinforcing beams.

12. A vehicle, comprising a battery tray and a battery module, wherein the battery tray is the battery tray of claim 1, the battery tray is connected to the vehicle, and the battery module is mounted at the battery tray.

* * * * *